United States Patent
Davidson et al.

(10) Patent No.: US 10,033,588 B2
(45) Date of Patent: Jul. 24, 2018

(54) ADAPTIVE NETWORK OF NETWORKS ARCHITECTURE

(71) Applicant: RAYTHEON COMPANY, Waltham, MA (US)

(72) Inventors: Steve Davidson, Marlborough, MA (US); Mark W. Henry, Marlborough, MA (US); Matt A. Kahn, Marlborough, MA (US); Gregory S. Schrecke, Marlborough, MA (US); Mu-Cheng Wang, Marlborough, MA (US); Pavan Reddy, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 648 days.

(21) Appl. No.: 14/079,085

(22) Filed: Nov. 13, 2013

(65) Prior Publication Data

US 2014/0136721 A1     May 15, 2014

Related U.S. Application Data

(60) Provisional application No. 61/726,314, filed on Nov. 14, 2012.

(51) Int. Cl.
*G06F 15/16* (2006.01)
*H04L 12/24* (2006.01)
(Continued)

(52) U.S. Cl.
CPC .......... *H04L 41/0893* (2013.01); *H04L 47/20* (2013.01); *H04L 47/22* (2013.01);
(Continued)

(58) Field of Classification Search
CPC ............ H04L 41/0893; H04L 41/0663; H04L 61/2507; H04L 61/00; H04L 47/20;
(Continued)

(56) References Cited

U.S. PATENT DOCUMENTS

| | | |
|---|---|---|
| 5,513,127 A | 4/1996 | Gard et al. |
| 6,085,222 A | 7/2000 | Fujino et al. |

(Continued)

OTHER PUBLICATIONS

C. Perkins "IP Mobility Support" RFC202, Network Working Group, Oct. 1996.*

(Continued)

*Primary Examiner* — David R Lazaro
(74) *Attorney, Agent, or Firm* — Schwegman Lundberg & Woessner, P.A.

(57) ABSTRACT

In one embodiment, a composite Network of Networks is created out of a set otherwise separate constituent networks by a system that includes an operations station and one or more gateways. The operations station is configured to transmit a set of policies for processing data packets travelling through a composite network, where the composite network includes two or more independent constituent networks. The gateways are each communicatively connected between two or more attached constituent networks. A first gateway is configured to receive a data packet from a first constituent network attached to the first gateway; determine one or more real-time network situational awareness characteristics; process the data packet by applying the policies to the data packet based at least in part on the network situational awareness characteristics; and transmit the data packet to a second network attached to the first gateway and distinct from the first constituent network.

25 Claims, 6 Drawing Sheets

(51) Int. Cl.
*H04W 40/30* (2009.01)
*H04W 40/24* (2009.01)
*H04L 12/823* (2013.01)
*H04W 80/04* (2009.01)
*H04L 12/813* (2013.01)
*H04L 12/815* (2013.01)
*H04L 29/12* (2006.01)

(52) U.S. Cl.
CPC .............. *H04L 47/32* (2013.01); *H04W 40/24* (2013.01); *H04W 40/30* (2013.01); *H04W 80/04* (2013.01); H04L 41/0663 (2013.01); H04L 61/2507 (2013.01)

(58) Field of Classification Search
CPC ........ H04L 47/22; H04L 47/32; H04W 80/04; H04W 40/24; H04W 40/30
USPC .................................................. 709/226, 230
See application file for complete search history.

(56) References Cited

U.S. PATENT DOCUMENTS

| | | | |
|---|---|---|---|
| 2002/0143948 A1* | 10/2002 | Maher, III .......... | H04L 47/2441 709/226 |
| 2004/0090972 A1 | 5/2004 | Barrett et al. | |
| 2004/0093426 A1* | 5/2004 | Sahasrabudhe ......... | H04L 29/06 709/238 |
| 2005/0080322 A1* | 4/2005 | Korman ............... | A61B 5/0006 600/300 |
| 2005/0175019 A1* | 8/2005 | Kalavade ............ | H04L 63/0823 370/400 |
| 2006/0146742 A1* | 7/2006 | Kawahara ......... | H04L 29/12009 370/328 |
| 2008/0022000 A1 | 1/2008 | Furuya et al. | |
| 2009/0003269 A1* | 1/2009 | Kumazawa ........... | H04L 45/124 370/328 |
| 2009/0276771 A1* | 11/2009 | Nickolov .............. | G06F 9/4856 717/177 |
| 2010/0014415 A1* | 1/2010 | Moeller .............. | H04L 12/2856 370/216 |
| 2011/0051725 A1* | 3/2011 | Janneteau ............... | H04L 12/18 370/390 |
| 2012/0166618 A1* | 6/2012 | Dahod .................... | H04L 12/66 709/224 |
| 2016/0285686 A1* | 9/2016 | Caldwell ............... | H04W 24/00 |

OTHER PUBLICATIONS

D. Maltz "On-Demand Routing in Multi-hop Wireless Mobile Ad Hoc Networks." May 2001.*

Antonio Manzalini et al., "Towards Resource-Aware Network of Networks", 2010 5th International Symposium on Wireless Pervasive Computing (ISWPC).*

Maltz. "On-Demand Routing in Multi-hop Wireless Mobile Ad Hoc Networks." May 2001 (May 2001). [retrieved on Jan. 25, 2014] Retrieved from the Internet < URL: http://www.google.com/url?sa=t&rct=j&q=&esrc=s&source=web&cd=1&cad=rja&ved=0CDQQFjAA&url=http%3A%2F%2Fwww.dtic.mil%2Fcgi-bin%2FGetTRDoc%3FAD%3DADA460040&ei=e-zlUurwHtLnoASer4KQBQ
&usg=AFQjCNHXR1j_LdeEM4gHj_b0x0qRiJCw QA&bvm=bv.59930103,d .cGU>, 191 pgs.

International Search Report & Written Opinion for International Patent Application No. PCT/US2013/069817, International Filing Date: Nov. 13, 2013, 14 pgs.

* cited by examiner

ADAPTIVE NETWORK OF NETWORKS ARCHITECTURE

CROSS REFERENCE TO RELATED APPLICATIONS

This application claims the benefit of U.S. Provisional patent application Ser. No. 61/726,314, filed Nov. 14, 2012, the contents of which are incorporated herein by reference thereto.

BACKGROUND

The present disclosure relates to networking and, more particularly, to forming a composite network of independent constituent networks treated as point-to-point data links, described as a Network of Networks (NoN).

Many networks, particularly tactical networks, are disconnected from other networks or points with which data might need to be exchanged. For example, the lack of connection may be due to variation in architecture, signaling structure, or internal format. In these cases, communication between networks may be impossible or may require manual intervention. As a result, networks may be unable to communicate data to desired locations in an efficient and timely manner.

Gatewaying is a technique that can be employed to connect otherwise dissimilar networks. Gateways are normally one-to-one interfaces that perform one or a combination of functions to include signaling conversion, format conversion, or other "bridging" functions. For complex networks, however, a complex gateway architecture is required. In a prior attempted solution, an aerial gateway Battlefield Aerial Communications Node was established to provide a centralized (i.e., hub-and-spoke) switchboard for transferring data between networks. This solution, however, is neither survivable nor scalable.

SUMMARY

In one embodiment, a system includes an operations station and one or more gateways. The operations station is configured to transmit a set of policies for processing data packets travelling through a composite network, where the composite network includes two or more independent constituent networks. The gateways are each communicatively connected between two or more adjacent constituent networks, and each configured to receive the policies from the operations station. A first gateway is configured to receive a data packet from a first constituent network adjacent to the first gateway; determine one or more real-time network situational awareness characteristics; process the data packet by applying the policies to the data packet based at least in part on the network situational awareness characteristics; and transmit the data packet to a second network adjacent to the first gateway and distinct from the first constituent network.

In another embodiment, a computer-implemented method includes configuring an operations station to transmit a set of policies for processing data packets travelling through a composite network, where the composite network includes two or more independent constituent networks. One or more gateway devices are configured to communicate data through the composite network, and to receive the policies from the operations station. A first gateway device is configured to receive a data packet from a first constituent network adjacent to the first gateway device; determine one or more real-time network situational awareness characteristics; process the data packet by applying the policies to the data packet based at least in part on the network situational awareness characteristics; and transmit the data packet to a second network adjacent to the first gateway device and distinct from the first constituent network.

In yet another embodiment, a computer program product includes a non-transitory computer readable storage medium having computer readable program code embodied thereon. The computer readable program code is executable by a processor to perform a method. The method includes configuring an operations station to transmit a set of policies for processing data packets travelling through a composite network, where the composite network includes two or more independent constituent networks. Further according to the method, one or more gateways are configured to communicate data through the composite network, and to receive the policies from the operations station. A first gateway is configured to receive a data packet from a first constituent network adjacent to the first gateway; determine one or more real-time network situational awareness characteristics; process the data packet by applying the policies to the data packet based at least in part on the network situational awareness characteristics; and transmit the data packet to a second network adjacent to the first gateway and distinct from the first constituent network.

Additional features and advantages are realized through the techniques of this disclosure. Other embodiments and aspects of the disclosure are described in detail herein and are considered a part of the claimed embodiments. For a better understanding of the various embodiments, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Various embodiments of a networking system provide centralized management input to a collection of decentralized gateways. Each gateway may include information about policies for handling data and passing data between constituent networks, such that each constituent network can behave as a destination network or as routing network through which data can be passed on its way to its destination network.

Figure 1:
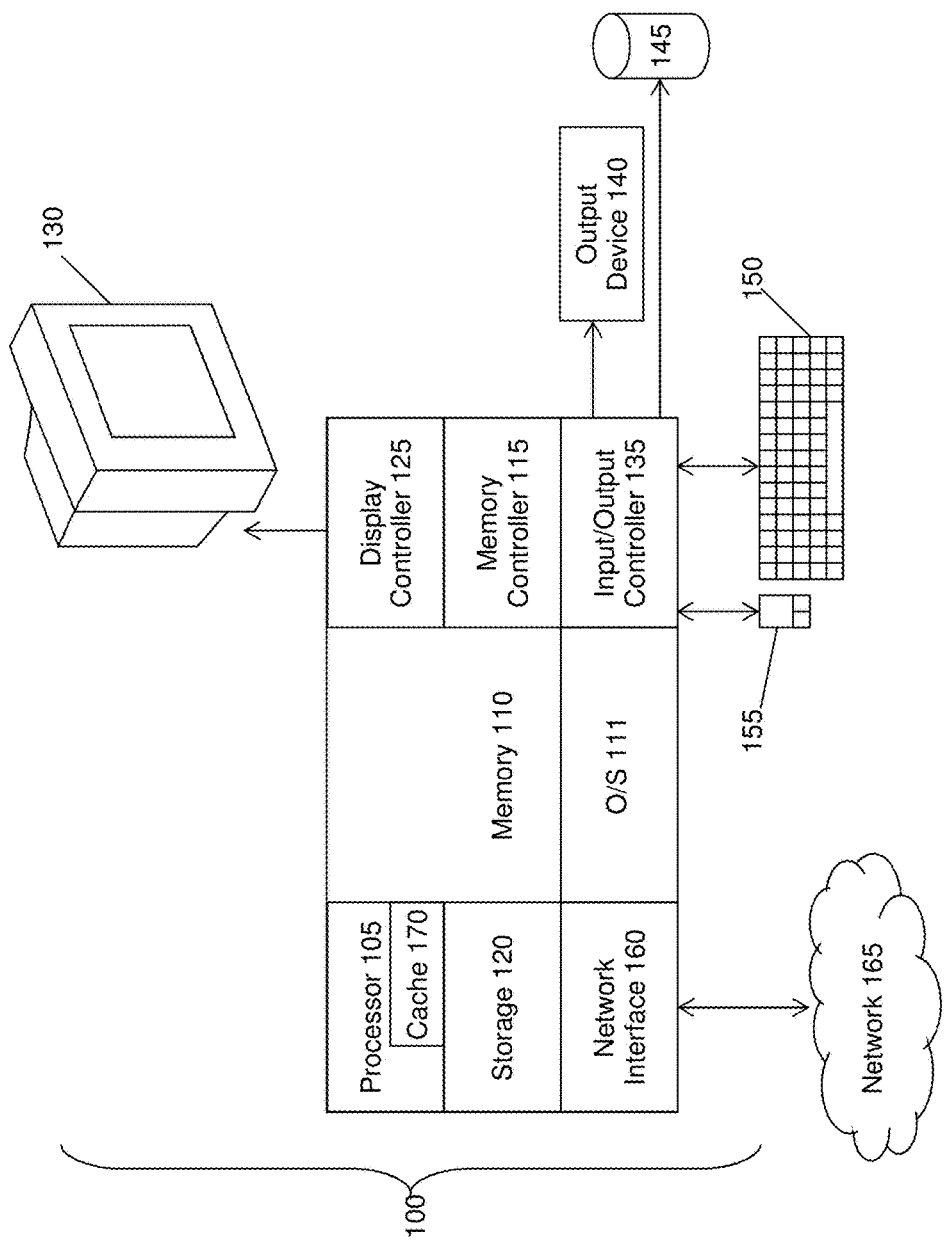
FIG. 1 illustrates a block diagram of an exemplary computer system for use in implementing a networking system or method, according to some embodiments of this disclosure.

FIG. 1 illustrates a block diagram of a computer system 100 for use in implementing a networking system or method according to some embodiments. Aspects of the networking systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as an embedded computer, a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a microprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external station, client and the like via a broadband connection, or for connection to one or more tactical radios. The network 165 transmits and receives data between the computer system 100 and external systems. In an exemplary embodiment, the network 165 may be a managed IP network administered by a service provider, who may be, for example, military command personnel. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Networking systems and methods according to this disclosure may be embodied, in whole or in part, in computer program products or in computer systems 100, such as that illustrated in FIG. 1.

Figure 2:
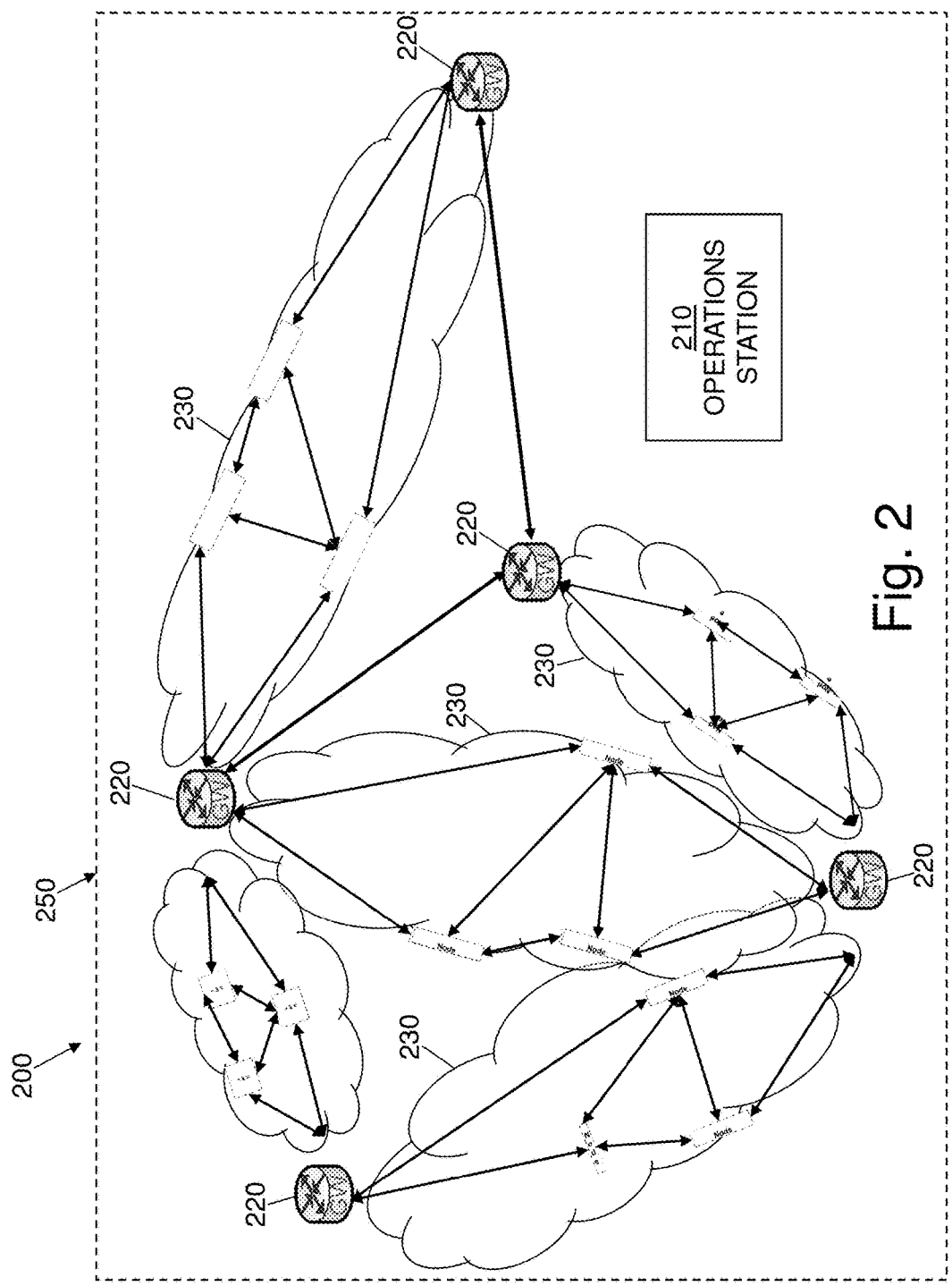
FIG. 2 is a block diagram of a networking system, according to some embodiments of this disclosure.

FIG. 2 is a block diagram of a networking system 200, according to some embodiments of this disclosure. As shown, the networking system 200 may include an operations station 210, one or more gateways 220, and two or more constituent networks 230. The operations station 210 may be embodied, in whole or in part, in a computer system 100 such as that shown in FIG. 1. Likewise, each gateway 220 may be embodied, in whole or in part, in such a computer system 100. The constituent networks 230 may each be various types of networks including a variety of devices. By way of the operations station 210 and the gateways 220, the networking system 200 may provide a composite network 250 for transmitting data between the devices of the various constituent networks 230, which may differ from one another in architecture, signaling structure, or information format.

Each constituent network 230 may be a network in its own right, including various nodes, or devices, between which data may be routed. For example, and not by way of limitation, a constituent network 230 may be a theater area network, not owned or operated by a provider of the networking system 200 or by an administrator of the operations station 210. The constituent networks 230 need not be of the same type and may include various types of networks included in the composite network 250. The constituent networks 230 may include, for further example, networks using Link-22, Situational Awareness Data Link (SADL), Link-16, Tactical Targeting Network Technology (TTNT), or Enhanced Position Location Reporting System (EPLRS). Accordingly, each constituent network 230 may behave independently for data passed internally within that network 230, maintaining a high degree of autonomy and local control. The constituent networks 230 need not be required to change their architecture, design, or function to participate in the composite network 250. Further, communications between the various devices inside a constituent network 230 may take many forms, dependent on the type of network the constituent network 230 is and further dependent on the types of devices inside the constituent network 230.

The networking system 200 may provide a unique architecture for a composite network 250 of heterogeneous networks, where each constituent network 230 is treated, in aggregate, as point-to-point connections for routing data through the composite network 250. The gateways 220, positioned between each pair of adjacent networks 230, may be automated, thereby eliminating or reducing the need to manage the gateways 220 individually. As a result, the networking system 200 may integrate the various constituent networks 230 into the composite network 250.

The operations station 210 may provide centralized planning for the networking system 200, including establishing policies, disseminating those policies to the gateways 220 for enforcement, and receiving network situational awareness updates from the gateways 220.

In some embodiments, the operations station 210 may provide one or more policies for the gateways 220 to follow in routing data through the composite network 250. These policies may vary based on many factors and based on specific implementation. The policies may include rules regarding how data should be routed, where each rule may depend on, for example, the type of data in question, the time of day, the types of constituent networks 230 involved, or various other factors. In general, the policies may be designed to route data efficiently through the composite network 250. Due to the policies being rules-based and event-correlated, these policies may be machine-independent, enabling the gateways 220 to use the same policies regardless of which constituent networks 230 are directly connected to each gateway 220. The policies provided by the operations station 210 and enforced by the gateways 230 may improve scalability and flexibility for managing distributed systems, as compared to existing art.

In some embodiments, the operations station 210 may include multiple computing devices, through which the various activities of the operations station 210 are distributed. Additionally, in some embodiments, at least one additional station may be used as a backup. In that case, the operations station 210 may duplicate its data onto the backup station, so the backup station can take over if the operations station 210 becomes inoperable or experiences service problems.

Figure 3:
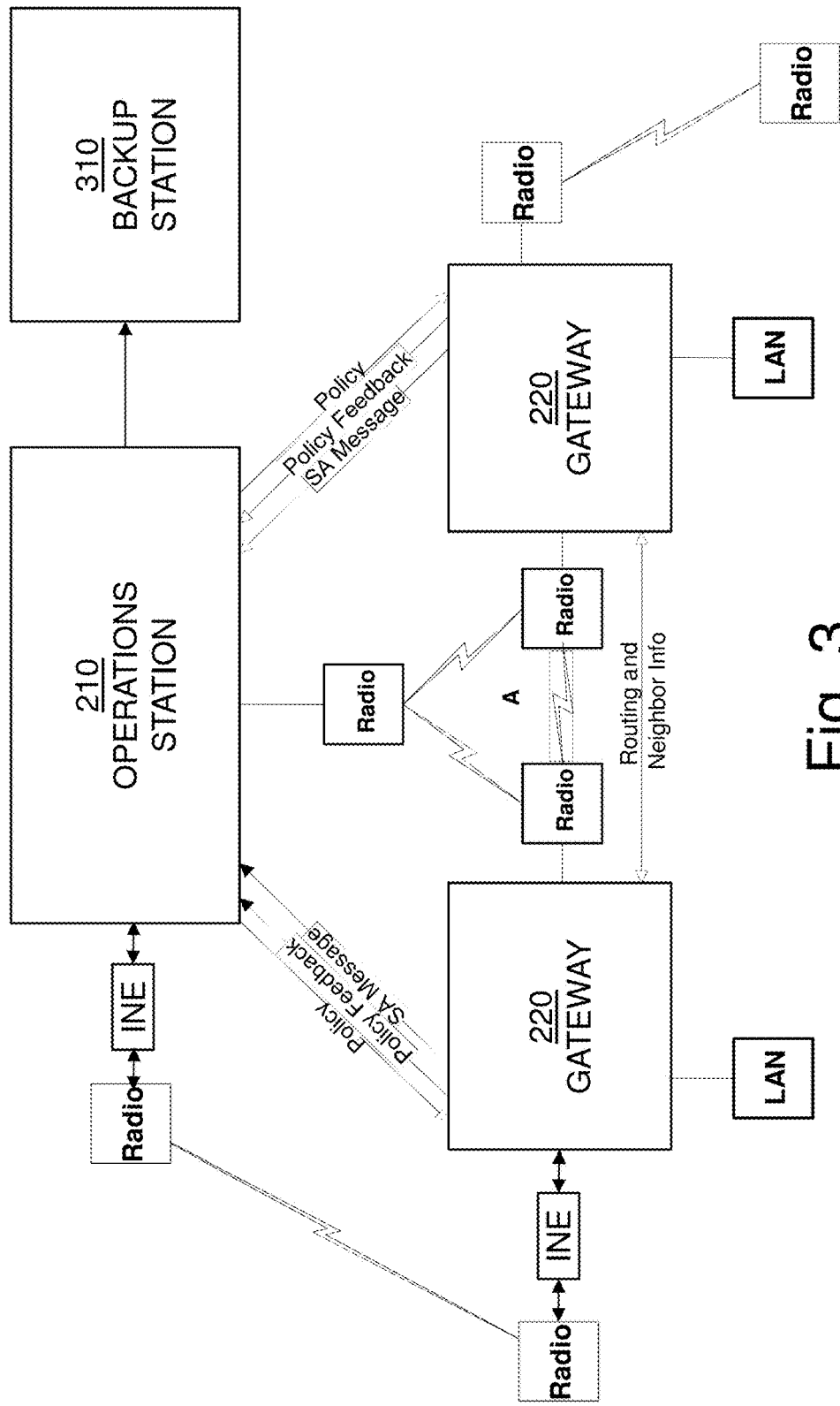
FIG. 3 is a block diagram of communications between an operations station and one or more gateways, according to some embodiments of this disclosure.

FIG. 3 is a block diagram of communications between the operations station 210 and the gateways 220. The operations station 210 may be responsible for overall configuration and management of the composite network 250, and may also include a terminal where a human administrator can control and monitor the composite network 250. To this end, the operations station 210 may handle one or more of the following activities for the composite network 250: network management, policy-based network management (PBNM), situational awareness (SA) processing, policy management, execution of manual overrides, confirmations to the various gateways 220, bringing gateways 220 online and offline as needed.

The gateways, located communicatively between the constituent networks 230, may be responsible for translating and routing data and for making and enforcing decisions based on the policies handed down by the operations station 210. To this end, the gateways 220 may handle one or more of the following activities for handling network traffic, in order to maintain their role as policy decision and enforcement points: message translation, address translation, load balancing, intelligent link selection, intelligent routing, traffic prioritization, data management, and security functions.

As shown, the gateways 220 may receive policies from the operations station 210 and communicate policy feedback and situational awareness data back to the operations station 210. In some embodiments, the operations station 210 need not be continuously connected to the networks, enabling the gateways 220 to operate independently from the operations station 210 and free of manual intervention. Policy feedback may include, for example, data related to the effects of the policies or error messages regarding enforcement of the policies. Network situational awareness data may include, for example, current speeds of data transmission and the real-time position of the gateway 220, which may or may not be aerial or otherwise mobile. The gateways 220 may also communicate with one another, as will be discussed further below. For example, as shown, the gateways 220 may exchange information about data routing.

Additionally, as shown, a backup station 310 may be in communication with the operations station 210. As discussed above, data on the operations station 210 may be duplicated onto the backup station 310, so that the backup station 310 can replace the operations station 210 if needed.

In some embodiments, the gateways 220 need not have integrated radios. Thus, gateways 220 may be connected to one another and to the operations station 210 by various external mechanisms. For example, a gateway 220 may be in communication with a radio, LAN, or other connectivity device. An inline network encryptor (INE) may be connected between a gateway 220 and its associated radio or network, so as to encrypt communications between gateways 220. Alternatively, a radio may have built-in encryption, in which case an INE may not be needed. In some embodiments, a gateway 220 may be connected to multiple radios, or networks, enabling the gateway 220 to communicate over multiple constituent networks 230 that may not otherwise have digital compatibility except through that gateway 220.

Figure 4:
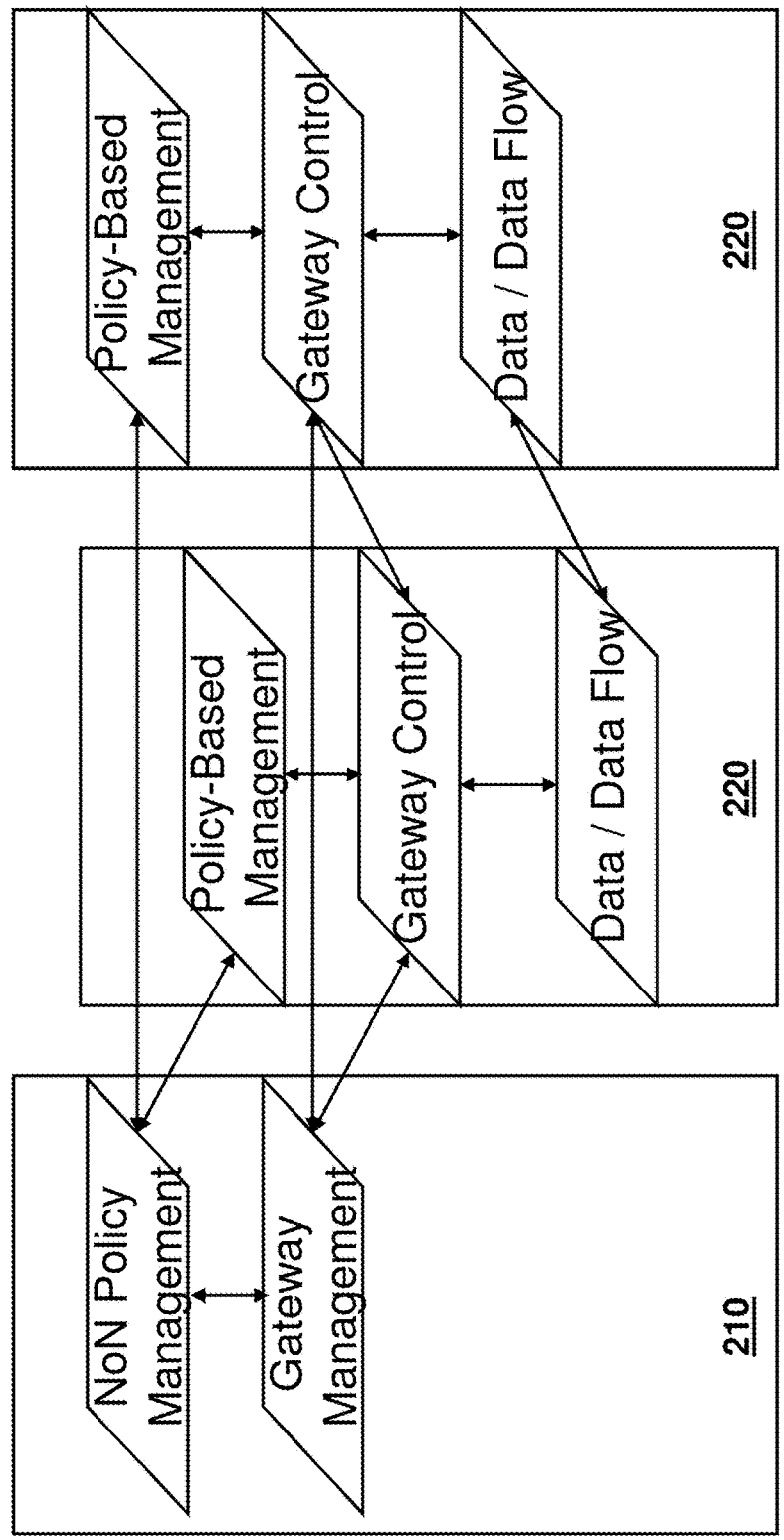
FIG. 4 is a block diagram illustrating data flow between various components of a composite network, according to some embodiments of this disclosure.

FIG. 4 is a second block diagram illustrating how data may flow between various components of the composite network 250, according to some embodiments. Although only two gateways 220 are shown in FIGS. 3-4, it will be understood that these two may be representative of the one or more gateways 220 used to facilitate operations of the composite network 250.

As shown in FIG. 4, the operations station 210 and a gateway 220 may each have a set of functional levels or planes, where each plane represents as type of operation performed. Each of these planes may include hardware, software, or a combination of both. It will be understood that the planes are provided in FIG. 4 for illustrative purposes only, and further that, in some implementations, the operations station 210 or a gateway 220 may share hardware across its planes.

In some embodiments, the operations station 210 may include a Network of Networks (NoN) policy management plane configured to manage policies for the composite network 250, and a gateway management plane configured to manage the gateways 220. The NoN policy management plane may include a mission planning tool and a real-time NoN manager. The mission planning tool may build and disseminate initial gateway configurations, and the real-time NoN manager may provide a dynamic view of the composite network 250, including connectivity lines, geographic positions, and gateway health. The gateway management plane may include a policy management station configured to disseminate policies to the gateways 220.

Each gateway 220 may include a policy-based management plane, a gateway control plane, and a data flow plane. The policy-based management plane may include a policy management entity (PME) responsible for receiving and processing policies from the policy management plane, and for making decisions based on current situations to enforce the policies. The gateway control plane may include a gateway manager responsible for situational awareness, health discovery and reporting, routing protocol overhead, and neighbor discovery. The data flow plane may be responsible for the actual translation, quality of service (QoS), and forwarding of data payloads and internally generated data.

As shown, the NoN policy management plane of the operations station 210 may be in communication with the policy-based management planes of the various gateways 220, so as to exchange information about policies. The gateway management plane of the operations station 210 may be in communication with the gateway control plane of the various gateways 220, so as to communicate various information, such as initial configuration, manual overrides, and other gateway controls. The gateways 220 may provide the operations station 210 with network situational awareness and other management information. The data flow planes of the gateways 220 may communicate with one another, for the purpose of passing actual data message payloads.

Figure 5:
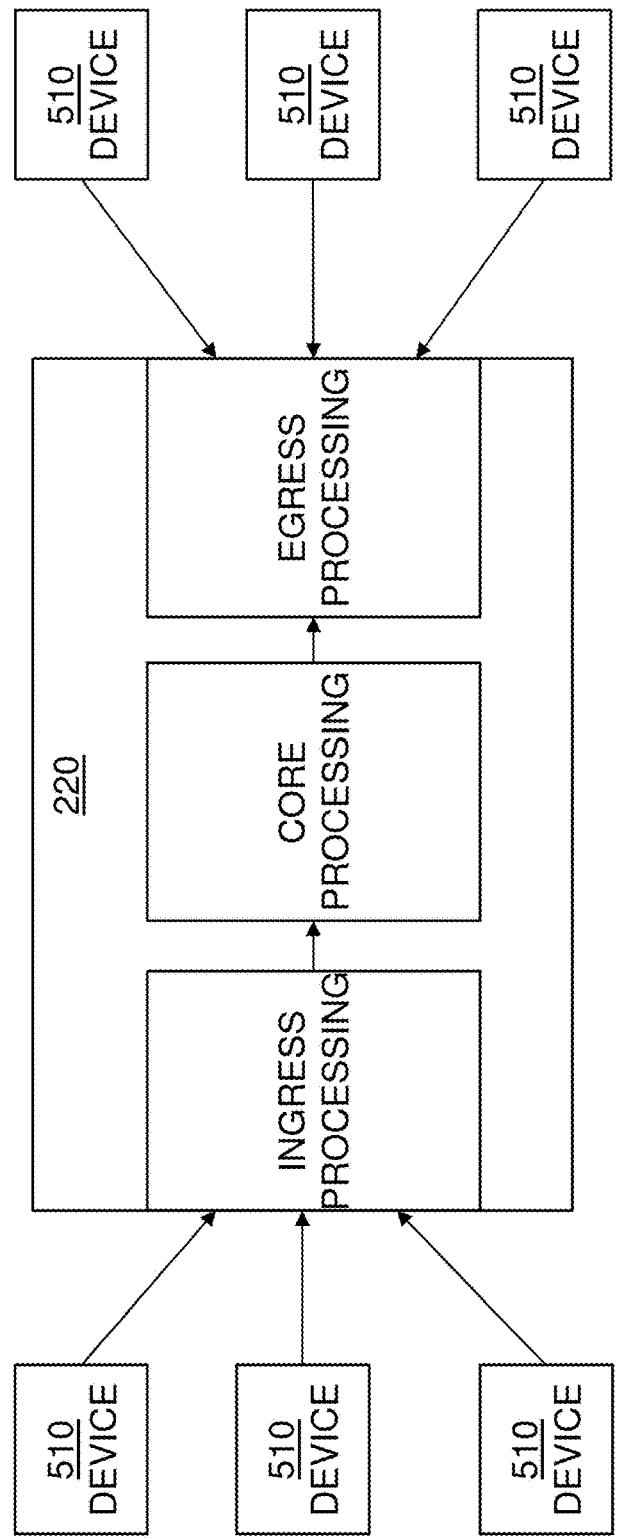
FIG. 5 is a block diagram of internal processes of a gateway, according to some embodiments of this disclosure.

FIG. 5 is a diagram of internal processes of a gateway 220, according to some embodiments, representative of the various gateways 220 in the composite network 250. As shown, the gateway 220 may communicate data from one constituent network 230 to another.

Together, the gateways 220 in the composite network 250 may manage and control the flow of data between the constituent networks 230 in a way deemed to be optimal. They may facilitate the working of the composite network 250 by providing their own self-forming, self-healing mobile ad-hoc network (MANET) among the gateways 220, treating each constituent network 230, as needed, as a point-to-point connection between the gateways 220. The gateways 220 may be automated based on the policies provided by the operations station 210, thereby reducing or eliminating the need for individual gateway management.

Gateways 220 at the intersection of the constituent networks 230 may communicate with one another using a MANET protocol that enables them to exchange neighbor relationship information and form localized or global routing tables to ensure optimal forwarding of user information packets between gateways 220, and further to determine whether a local gateway 220 is the last gateway 220 (i.e., the one directly connected to the constituent network 230 of the final destination). The gateways 220 may support unicast, multicast, broadcast, anycast, or a combination of these.

Among other tasks, the gateways 220 may be responsible for message translation and forwarding. The gateways 220 may break down information stovepipes at the edges of constituent networks 230, such as by repackaging and transcoding. The gateways 220 may be capable of neighbor discovery, by which they can find one another in the dynamic environment to enable coordination and integration. They may be configured to intelligent load balancing, enabling an effective use of bandwidth. In some embodiments, the gateways 220 may control the flow of data in part using data thinning and other techniques between high- and low-throughput links, thereby enabling data to flow efficiently between and through the constituent networks 230. Intelligent data link selection may be used so that the resulting routes are suited to the data being routed, including the destination and format of that data. The gateways 220 may be further enabled to optimize data based on the data content, format, and destination. As a result, using the policies passed down from the operations station 210, the gateways 220 may move data through the composite network 250 in an intelligent manner, based on real-time situations and data attributes.

Each gateway 220 may be connected, directly or indirectly (via some form of communication device, such as a network interface, serial interface, or data bus, for example) to a radio or a network interface device 510 for communication with each constituent network 230 the gateway 220 touches. In some cases, a gateway 220 may use the same network interface device 510 to communicate with multiple attached constituent networks 230. In some other cases, however, a communication interface device 510 may be needed for each distinct constituent network 230. Because a constituent network 230 is internally connected as well, the gateway 220 may thus be in communication with all devices 510 in the constituent networks 230, either directly or indirectly. Accordingly, the gateway 220 may receive data from a first device 510 in a first constituent network 230 to which it is adjacent, and communicate that data to a second device 510 in a second constituent network 230 to which it is adjacent. Further, as the various gateways 220 of the composite network 250 may be in communication with one another, the gateway 220 may additionally act as intermediaries in communicating data across the constituent networks 230 of the entire composite network 250.

As shown in FIG. 5, when data is received at the gateway 220, the gateway 220 may perform activities related to ingress processing, core processing, and egress processing. After the egress processing is performed, the gateway 220 may transmit the processed data to a device 510 in one of its adjacent constituent networks 230.

Figure 6:
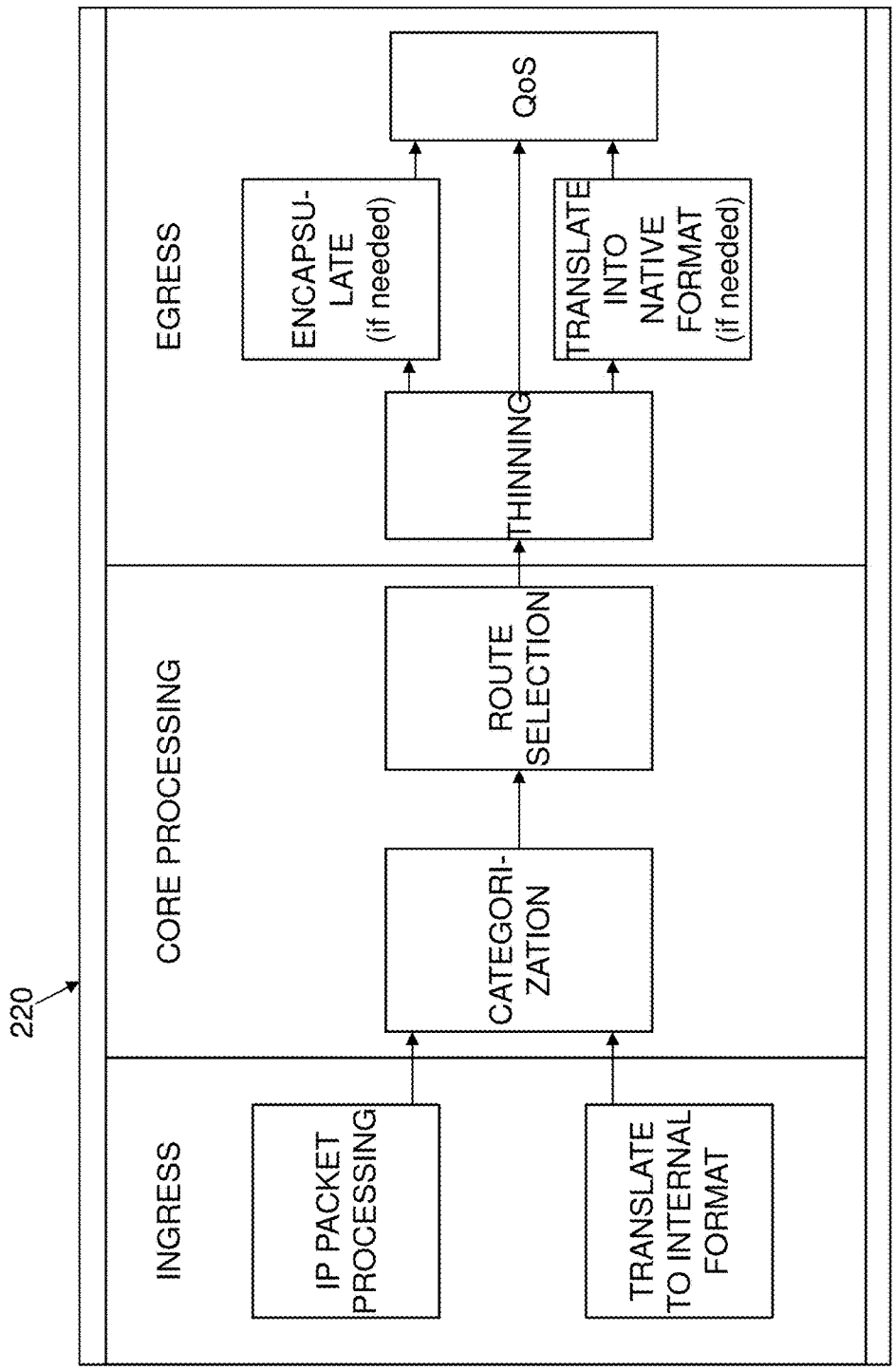
FIG. 6 is a more detailed block diagram of the gateway's internal operations, according to some embodiments of this disclosure.

FIG. 6 is a more detailed diagram of the gateway's internal operations, according to some embodiments. As shown, the ingress processing may include IP header processing for data received from IP radios, and translation to a gateway-internal representation for data received from IP radios, non-IP radios, or both. The gateway 220 may encapsulate the datagrams from non-IP radios into IP datagrams, with associated IP headers created to match. Thus, the translation into an IP-based internal representation may enable the data to be processed using standards common across the composite network 250. More specifically, in some embodiments, the internal representation used may be an IP/XML format. Additionally, during ingress processing, a constituent-network-specific address may be converted into a NoN-wide virtual address, resulting in an gateway-native datagram.

During core processing, the gateway 220 may perform packet categorization and route selection. During the route selection, the gateway 220 may consider various factors related to the category of packet being processed, current conditions, and network policies. The gateway 220 may additionally consider the data packet's final destination, including whether the destination device 510 is in a directly connected constituent network 230 (i.e., the "to" network) or in a constituent network 230 that requires the gateway 220 to route the data through one of its directly constituent networks (i.e., in that case, a "through" network) to another gateway 220. If the current gateway 220 determines that it should route the data to another gateway 220, using an adjacent constituent network 230 as a "through" network, the gateway 220 may then select a routing destination deemed suited for routing the data through its constituent network 230 toward the next gateway 220.

During egress processing, the gateway 230 may perform various activities, including, for example, thinning, encapsulating the data as needed, translation, and QoS enforcement as needed. During thinning, the gateway 220 may process the data so as to make it more suitable for being passed across a lower-throughput network. This may be performed if the constituent network 230 "to" or "through" which the data is to be routed is deemed to have low available throughput relative to the required data rate. Thinning may include, for example, discarding portions of the data that are not needed for understanding of the data by the eventual final destination device 510. The encapsulation may be performed for data that is to be routed through, as opposed to "to," an adjacent constituent network 230. This may include transforming the data into an internal representation understandable by the net gateway 220, as the various devices 510 between the current gateway 220 and the next gateway 220 need not read the actual data payload. For data being passed "to," as opposed to "through," an adjacent directly connected constituent network 230, the gateway 220 may translate the data from its internal representation to a representation native to the adjacent constituent network 230. In this case, encapsulation need not be used because the gateways 220 may deliver the data in the format, and with the structure, native to the directly connected constituent network 230. After such encapsulation or translation, if needed, is performed, the gateway 220 may perform QoS enforcement if needed.

Upon receiving data from a gateway 220, a constituent network 230 may perform as usual per its internal policies, which may be independent from policies used by the networking system 200. Because the data received from the gateway 220 may already be in the constituent network's native format if the constituent network 230 is the destination network 230, the various devices 510 within the constituent network 230 need not be aware of their role in the composite network 250. Rather, they may simply route the data to the destination device as they normally would. As a result, the data may reach its destination inside the constituent network 230 or may travel through the constituent network 230 to the next gateway 220, as per routing instructions from the gateway 220. Further, by chaining gateways 220 together, using the constituent network 230 as data links, the networking system 200 may enable data to be passed across one or more gateways 220 from a first device 510 in one constituent network 230 to a second device 510 in some other constituent network 230.

As a result of the above, the networking system 200 may provide an efficient mechanism for data to be passed between constituent networks 230 that may otherwise be unable to communicate with one another due to differing internal designs or differing architectures.

The corresponding structures, materials, acts, and equivalents of all means or step plus function elements in the claims below are intended to include any structure, material, or act for performing the function in combination with other claimed elements as specifically claimed. The description of the various embodiments has been presented for purposes of illustration and description, but is not intended to be exhaustive or limited to the forms disclosed. Many modifications and variations will be apparent to those of ordinary skill in the art without departing from the scope and spirit of this disclosure. The embodiments were chosen and described to best explain the principles of the various embodiments and the practical applications, and to enable others of ordinary skill in the art to understand the embodiments with various modifications as are suited to the particular use contemplated.

While some embodiments have been described, it will be understood that those skilled in the art, both now and in the future, may make improvements and enhancements that fall within the scope of the claims that follow. These claims should be construed to maintain the proper protection for the embodiments first described.

What is claimed is:

1. A system comprising:
   an operations station configured to transmit a set of policies for processing data packets traveling through a composite network, the composite network comprising two or more independent constituent networks; and
   one or more gateways in communication with the operations station through the composite network, each communicatively connected between two or more constituent networks attached to the gateway, and each configured to receive the policies from the operations station through the composite network and provide feedback regarding enforcement of the policies and network situational awareness updates to the operations station, the network situational awareness updates comprising a real-time position of the gateway when the gateway is mobile,
   wherein a first gateway is further configured to:
      receive a data packet from a first constituent network attached to the first gateway;
      determine one or more real-time network situational awareness characteristics;
      process the data packet by applying the policies to the data packet based at least in part on the network situational awareness characteristics;
      transmit the data packet to a second constituent network attached to the first gateway and distinct from the first constituent network; and
      perform thinning on the data packet if the second constituent network has a lower throughput than the first constituent network, the thinning comprising discarding portions of the data packets that are not needed for understanding of the data packets by an eventual final destination device.

2. The system of claim 1, wherein the one or more gateways comprise at least two gateways connected to one another by way of the constituent networks and exchange information about data routing and message data payloads, and
   wherein the operations station is configured to provide centralized management input to the gateways.

3. The system of claim 1, wherein the first gateway is further configured to:
   determine whether a destination device for the data packet is in the second constituent network; and
   translate the data packet into a format native to the second constituent network if the destination device is in the second constituent network.

4. The system of claim 1, wherein the first gateway is configured to use the second constituent network as a data link to communicate the data packet to a second gateway among the one or more gateways.

5. The system of claim 4, wherein the first gateway is further configured to:
determine whether a destination device for the data packet is in the second constituent network; and
encapsulate the data packet into a format compatible with the second constituent network and transmit the data packet to the second gateway if the destination device is not in the second constituent network.

6. The system of claim 1, wherein the one or more gateways are configured to communicate the data packet from a first device in an origination constituent network to a second device in a destination constituent network.

7. The system of claim 1, wherein the first gateway is connected to the first constituent network through a first radio and to the second constituent network through a second radio, and wherein the first radio and the second radio are incompatible or on separate networks.

8. The system of claim 1, wherein the first gateway is further configured to convert a destination address of the data packet to a virtual address that is unique among devices in the composite network.

9. The system of claim 8, wherein:
the virtual address is a Network of Networks (NoN)-wide virtual address to result in a gateway-native datagram.

10. The system of claim 1, wherein the operations station is intermittently continuously connected to the operations network such that the first gateway is configured to operate independently from the operations station and free of manual intervention when disconnected from the operations station.

11. The system of claim 1, further comprising:
a backup station in communication with the operations station and the one or more gateways through the operations network, the backup station containing data duplicated from the operations station and configured to take over for the operations station in response to the operations station becoming inoperable or experiencing service problems.

12. The system of claim 1, wherein the operations station comprises:
a Network of Networks (NoN) policy management plane configured to manage policies for the composite network and in communication with a policy-based management plane of the one or more gateways, the NoN policy management plane comprising:
a mission planning tool configured to build and disseminate initial gateway configurations and a real-time NoN manager configured to provide a dynamic view of the composite network, including connectivity lines, geographic positions, and gateway health, and a gateway management plane comprising a policy management station configured to disseminate policies, including initial configuration, manual overrides, and other gateway controls, to the one or more gateways and in communication with a gateway control plane of the one or more gateways.

13. The system of claim 1, wherein:
the network situational awareness updates comprise:
current speeds of data transmission through the gateway, and the feedback regarding enforcement of the policies comprises:
data related to effects of the policies, and
error messages regarding enforcement of the policies.

14. The system of claim 1, wherein the first gateway is further configured to:
encapsulate datagrams from non-Internet Protocol (IP) radios into IP datagrams, with associated IP headers created to match.

15. The system of claim 1, wherein:
the policies include rules regarding how data should be routed through the composite network, and
each rule depends on a type of the data, a time of day, and types of the two or more constituent networks attached to the gateway.

16. A computer-implemented method, comprising:
configuring an operations station to transmit a set of policies for processing data packets traveling through a composite network, the composite network comprising two or more independent constituent networks; and
configuring one or more gateway devices to communicate data through the composite network and to receive the policies from the operations station through the composite network, comprising configuring a first gateway device to:
receive a data packet from a first constituent network attached to the first gateway device;
determine one or more real-time network situational awareness characteristics;
process the data packet by applying the policies to the data packet based at least in part on the network situational awareness characteristics;
transmit the data packet to a second constituent network attached to the first gateway device and distinct from the first constituent network;
perform thinning on the data packet if the second constituent network has a lower throughput than the first constituent network, the thinning comprising discarding portions of the data packets that are not needed for understanding of the data packets by an eventual final destination device; and
provide feedback regarding enforcement of the policies and network situational awareness updates to the operations station, the network situational awareness updates comprising a real-time position of the gateway when the gateway is mobile.

17. The method of claim 16, wherein the one or more gateway devices comprise at least two gateway devices connected to one another by way of the constituent networks, and wherein the operations station is configured to provide centralized management input to the gateway devices.

18. The method of claim 16, further comprising configuring the first gateway device to:
determine whether a destination device for the data packet is in the second constituent network; and
translate the data packet into a format native to the second constituent network if the destination device is in the second constituent network.

19. The method of claim 16, wherein the first gateway device is configured to use the second constituent network as a data link to communicate the data packet to a second gateway device among the one or more gateway devices.

20. The method of claim 16, further comprising configuring the first gateway device to convert a destination address of the data packet to a virtual network address that is unique among potential destination devices in the composite network.

21. A computer program product comprising a non-transitory computer readable storage medium having computer readable program code embodied thereon, the computer readable program code executable by a processor to perform a method comprising:

configuring an operations station to transmit a set of policies for processing data packets traveling through a composite network, the composite network comprising two or more independent constituent networks; and transmitting the policies over the composite network to one or more gateways through the composite network; configuring the one or more gateways to communicate data through the composite network and to receive the policies from the operations station through the composite network, comprising configuring a first gateway to:

receive a data packet from a first constituent network attached to the first gateway;

determine one or more real-time network situational awareness characteristics;

process the data packet by applying the policies to the data packet based at least in part on the network situational awareness characteristics;

transmit the data packet to a second constituent network attached to the first gateway and distinct from the first constituent network;

perform thinning on the data packet if the second constituent network has a lower throughput than the first constituent network, the thinning comprising discarding portions of the data packets that are not needed for understanding of the data packets by an eventual final destination device; and provide feedback regarding enforcement of the policies and network situational awareness updates to the operations station, the network situational awareness updates comprising a real-time position of the gateway when the gateway is mobile.

22. The computer program product of claim 21, wherein the one or more gateways comprise at least two gateways connected to one another by way of the constituent networks, and wherein the operations station is configured to provide centralized management input to the gateways.

23. The computer program product of claim 21, further comprising configuring the first gateway to:

determine whether a destination device for the data packet is in the second constituent network; and translate the data packet into a format native to the second constituent network if the destination device is in the second constituent network.

24. The computer program product of claim 21, wherein the first gateway is configured to use the second constituent network as a data link to communicate the data packet to a second gateway among the one or more gateways.

25. The computer program product of claim 21, further comprising configuring the first gateway to convert a destination address of the data packet to a virtual network address that is unique among potential destination devices in the composite network.

* * * * *